United States Patent [19]

Araki

[11] Patent Number: 5,103,788

[45] Date of Patent: Apr. 14, 1992

[54] INTERNAL COMBUSTION ENGINE IGNITION TIMING DEVICE

[75] Inventor: Akihiko Araki, Gunma, Japan

[73] Assignee: Japan Electronic Control Systems Co., Ltd., Isezaki, Japan

[21] Appl. No.: 671,401

[22] Filed: Mar. 19, 1991

[30] Foreign Application Priority Data

Mar. 19, 1990 [JP] Japan .................................. 2-67283

[51] Int. Cl.$^5$ ............................................. F02P 5/15
[52] U.S. Cl. .................................... 123/416; 123/418
[58] Field of Search .............. 123/414, 415, 416, 417, 123/418, 609, 612, 613, 617, 620, 643

[56] References Cited

U.S. PATENT DOCUMENTS

| | | | |
|---|---|---|---|
| 4,298,941 | 11/1981 | Furuhashi | 123/417 X |
| 4,491,121 | 1/1985 | Miura et al. | 123/617 X |
| 4,553,208 | 11/1985 | Akiyama et al. | 123/417 X |
| 4,584,978 | 4/1986 | Sasaki et al. | 123/416 X |
| 4,586,473 | 5/1986 | Nguyen | 123/416 X |
| 4,643,150 | 2/1987 | Miura et al. | 123/418 |
| 4,665,884 | 5/1987 | Yoshida et al. | 123/416 X |
| 4,831,318 | 5/1989 | Yuasa et al. | 123/416 X |

Primary Examiner—Willis R. Wolfe
Attorney, Agent, or Firm—Foley & Lardner

[57] ABSTRACT

In order to reduce erroneous ignition timing to the maximum possible degree, an arbitrary point is defined between the trailing edge of a basic control pulse and TDC. The ADV at which ignition should occur is determined to be advanced or retarded with respect to the same. If it is found that the ADV is advanced with respect to the arbitrary point where a calculation, which is initiated at the trailing edge of the basic control pulse cannot be completed in time, a time period from the leading edge is derived and a counter started. Alternatively, if a count is not proceeding and a trailing edge is detected, a second time is derived and the counter started. If it is found that the counter is running but the degree of ignition advance is such as to fall between the leading and trailing edges of the basic reference control pulse, the count is stopped and ignition immediately induced.

4 Claims, 3 Drawing Sheets

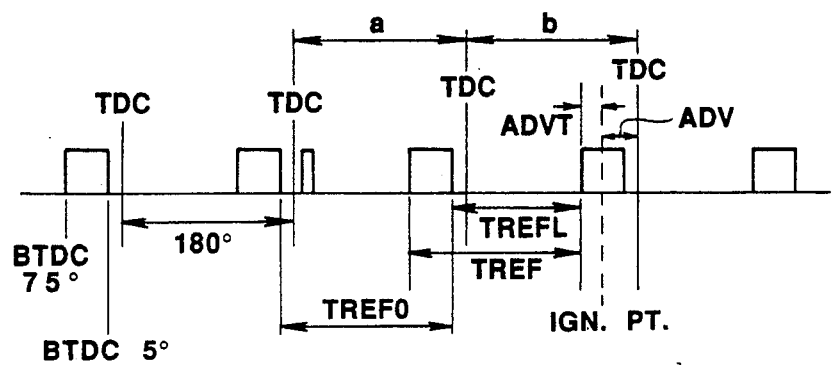
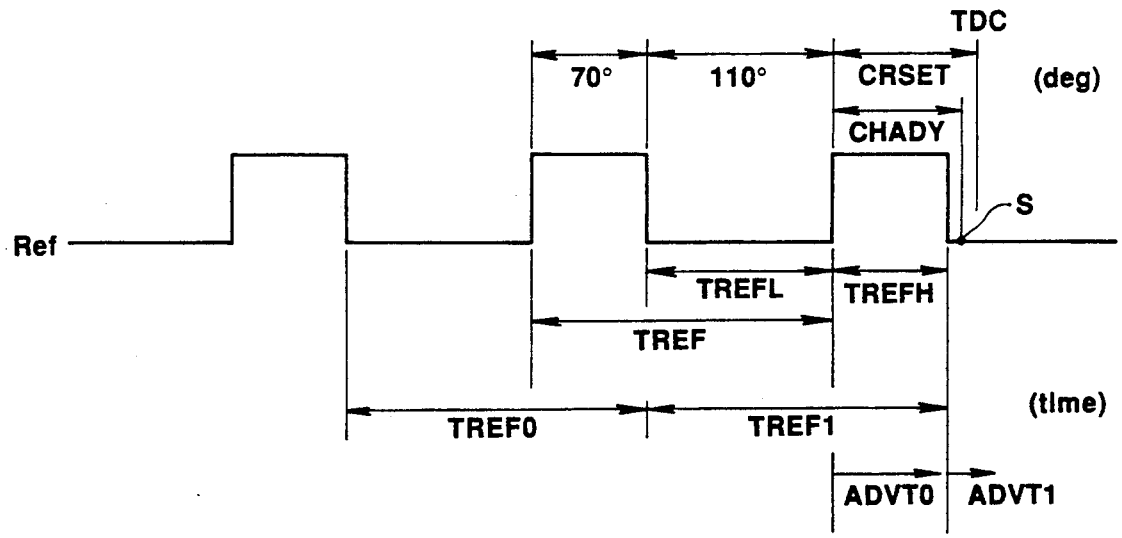

INTERNAL COMBUSTION ENGINE IGNITION TIMING DEVICE

BACKGROUND OF THE INVENTION

1. Field of the Invention

The present invention relates generally to an ignition control system and more specifically to a ignition control system wherein the crank angle level change from a predetermined crank angle position is determined using a basic control signal and which estimates the delay period after which the ignition should be implemented.

2. Description of the Prior Art

Electronic engine control system determines the ignition timing (crank angle) in accordance with engine operating parameters and output an ignition control signal at the calculated timing.

In order to achieve this control it is usual to use a crank angle sensor arrangement which generates a basic control signal or signals and a series of timing signals at 1° or 2° during the intervals between the generation of the basic control ones. The control system initiates engine ingition a predetermined number of timing signals have been detected as being generated after a basic control signal.

However, this technique requires that the crank angle sensor exhibit a very high degree of accuracy. Achieving this accuracy of course increases the cost of the sensor considerably.

To overcome this problem it has been proposed JP-A-61-285584 to use a technique wherein the crank angle sensor is arranged to produce only the basic control signal or signals and to estimate via calculation, the time after the generation of basic control pulse or signal that an ignition command signal should be generated.

However, this technique has suffered from the drawback that during transitional engine operation such as acceleration, deceleration etc. For example, during acceleration wherein the engine rotational speed increases, the ignition advance tends to diverge from the appropriate timing in a manner which tends to result in after-burn, power loss, misfiring etc, which lead to the increase of CO and HC emissions and the amount of fuel which is consumed. On the other hand, during deceleration, as the engine speed reduces the ignition retardation tends to deviate in a manner which invites misfire and engine knocking.

Therefore, when the above type of crank angle sensor is used, it has been suggested that in addition to the control pulse generation period, the period variation rate (the deviation between the instant period and the immediately previous one) be derived and used in combination with the period.

That is to say, as shown in FIG. 1, the crank angle sensor is such that the leading and trailing edges of a basic control signal REF are arranged to be produced respectively at 75° ad 5° before TDC of the compression stroke of each cylinder.

The time period ADVT defined between the point in time at which the trailing edge of the REF pulse occurs and the point in time at which the appropriate ignition timing ADV occurs, is derived and a timer used to count from the generation of the REF pulse to the time at which the ignition control signal should be issued.

More specifically, the above ADVT value is derived using the following equation:

$$ADVT = TREFL \frac{(75 - ADV)}{110} - \quad (1)$$

$$K(TREFO - TREF) \frac{(75 - ADV)}{180}$$

The first part of this equation defines a proportional value which is related to the REF period. Viz., if the engine speed is constant, the first part of the equation represents a proportional valve which is based an interval TREFL defined between the trailing edge of the previous REF pulse and the leading edge of the instant REF pulse (hereinafter referred to as the proportional control valve). The second part of equation (1) involves the rate of change of the REF period. Viz., this part of the equation makes use of the difference between a value TREFO (defined between trailing edges of the REF pulse and a value TREF defined between the leading edges of the REF pulse, as modified by a proportional constant K. Thus, during the time the engine speed increases, according to the amount by which the rate of change increases, the ignition timing is advanced. On the other hand, during the time the engine speed is decreasing the ignition timing is retarded in accordance with the amount by which the rate of change reduces. Hereinafter the second part of the equation will be referred to as the anticipation control value.

However, even when this type of technique is employed in combination with the above mentioned type of simplified rotational angle or crank angle sensor in order to avoid the cost increasing precision requirements, still the following problems are encountered.

For example, if as shown in FIG. 1, during the period a the crank angle speed increases while in period b the crank angle speed decreases, an error in the retardation is introduced into the proportional control factor. Thus, even though the anticipation control value is provided, as the crank angle speed is changing in the above described manner, an error in the anticipated degree of advance is induced. This in effect increased the magnitude of the error and results in the amount of erroneous advancement being markedly increased.

Further, as the proportional control valve is derived using the value TREFL which is defined between the trailing edge of the previous REF pulse and the leading edge of the instant REF pulse and the anticipation control value is estimated based on the rate of change between the previous period TREFO and the instant TREF period, the above mentioned error is amplified to the degree that misfire and knock tend to be promoted.

In view of the above problem, it has been thought to calculate the above mentioned ADVT period with respect to the trailing edge of the REF pulse, however depending on the engine operating conditions it sometimes happens that by the time the calculation process has been completed, the proper ignition timing has already been passed and the ignition timing is shifted to the point of deteriorating the combustion characteristics.

SUMMARY OF THE INVENTION

An object of the present invention is to provide a control technique which enables the use of the above described simplified type of crank angle sensor and which uses the period with which the basic control pulse is generated to calculate the ignition control timing in a manner which enables the error, which is encountered with the above described type of prior art, to be limited to the maximum possible degree.

In brief, the above object is achieved by an arrangement wherein an arbitrary point is defined between the trailing edge of a basic control pulse and TDC. The ADV at which ignition should occur is determined to be advanced or retarded with respect to the same. If it is found that the ADV is advanced with respect to the arbitrary point where a calculation, which is initiated at the trailing edge of the basic control pulse cannot be completed in time, a time period from the leading edge is derived and a counter started. Alternatively, if a count is not proceeding and a trailing edge is detected, a second time is derived and the counter started. If it is found that the counter is running but the degree of ingition advance is such as to fail between the leading and trailing edges of the basic reference control pulse, the count is stopped and ignition immediately induced.

More specifically, a first aspect of the present invention comes in an engine ignition system which features: means for generating a basic control pulse in a manner wherein the leading edge of the pulse is generated at a first predetermined crank angle and the trailing edge is generated at a second predetermined crank angle; first means for estimating the time period from the point in time at which the level of the basic control pulse changes to the point in time at which an ignition control signal should be generated, based on at least the period at which the basic control pulse is generated; second means for determining if the time required for the time period estimation which is initiated at the same time the leading edge is generated, will finish before a predetermined crank angle which occurs at a location retarded by a predetermined amount with respect to the time point at which trailing edge of basic control pulse occurs, or not; and third means for, in the event that said second means indicates that the time required for the time period estimation will finish before a predetermined crank angle which occurs at a location retarded by a predetermined amount with respect to the time point at which trailing edge of basic control pulse occurs, recalculating at or before the time point at which the trailing edge occurs, the time from the point in time at which the trailing edge occurs to the point in time at which the ignition control signal should be generated, using at least the period defined between the leading and trailing edges.

An important feature of the above arrangement comes in that the first means utilizes: a proportional factor which is based on the period defined between the point in time the leading edge of the instant basic control pulse occurs and the point in time the leading edge of the previous basic control pulse occurred, and an anticipation factor which is based on the rate at which periods defined between one of the leading and trailing edges of the instant and last two consecutive basic control pulses.

A second aspect of the present invention comes in a method of controlling the ignition of an internal combustion engine, which features the steps of: generating a basic control pulse in a manner wherein the leading edge of the pulse occurs at a first predetermined crank angle and the trailing edge occurs at a second predetermined crank angle; estimating the time period from the point in time at which the level of the basic control pulse changes to the point in time at which an ignition control signal should be generated, based on at least the period at which the basic control pulse is generated; determining if the time required for the time period estimation which is initiated at the same time the leading edge is generated, will finish before a predetermined crank angle which occurs at a location retarded by a predetermined amount with respect to the time point at which trailing edge of basic control pulse occurs, or not; and in the event that the time required for the time period estimation will finish before a predetermined crank angle which occurs at a location retarded by a predetermined amount with respect to the time point at which trailing edge of basic control pulse occurs, recalculating at or before the time point at which the trailing edge occurs, the time from the point in time at which the trailing edge occurs to the point in time at which the ignition control signal should be generated, using at least the period defined between the leading and trailing edges.

An important aspect of this method comes in that the second of the above steps wherein the time period from the point in time at which the level of the basic control pulse changes to the point in time at which an ignition control signal should be generated, is estimated includes the use of a proportional factor which is based on the period defined between the point in time the leading edge of the instant basic control pulse occurs and the point in time the leading edge of the previous basic control pulse occurred; and an anticipation factor which is based on the rate at which periods defined between one of the leading and trailing edges of the instant and last two consecutive basic control pulses.

BRIEF DESCRIPTION OF THE DRAWINGS

FIG. 1 is a timing chart discussed in connection with the prior art described the opening paragraphs of the instant disclosure.

FIG. 3 is timing chart which shows the manner in which the present invention derives the appropriate ignition timing.

DETAILED DESCRIPTION OF THE PREFERRED EMBODIMENTS

Figure 2:
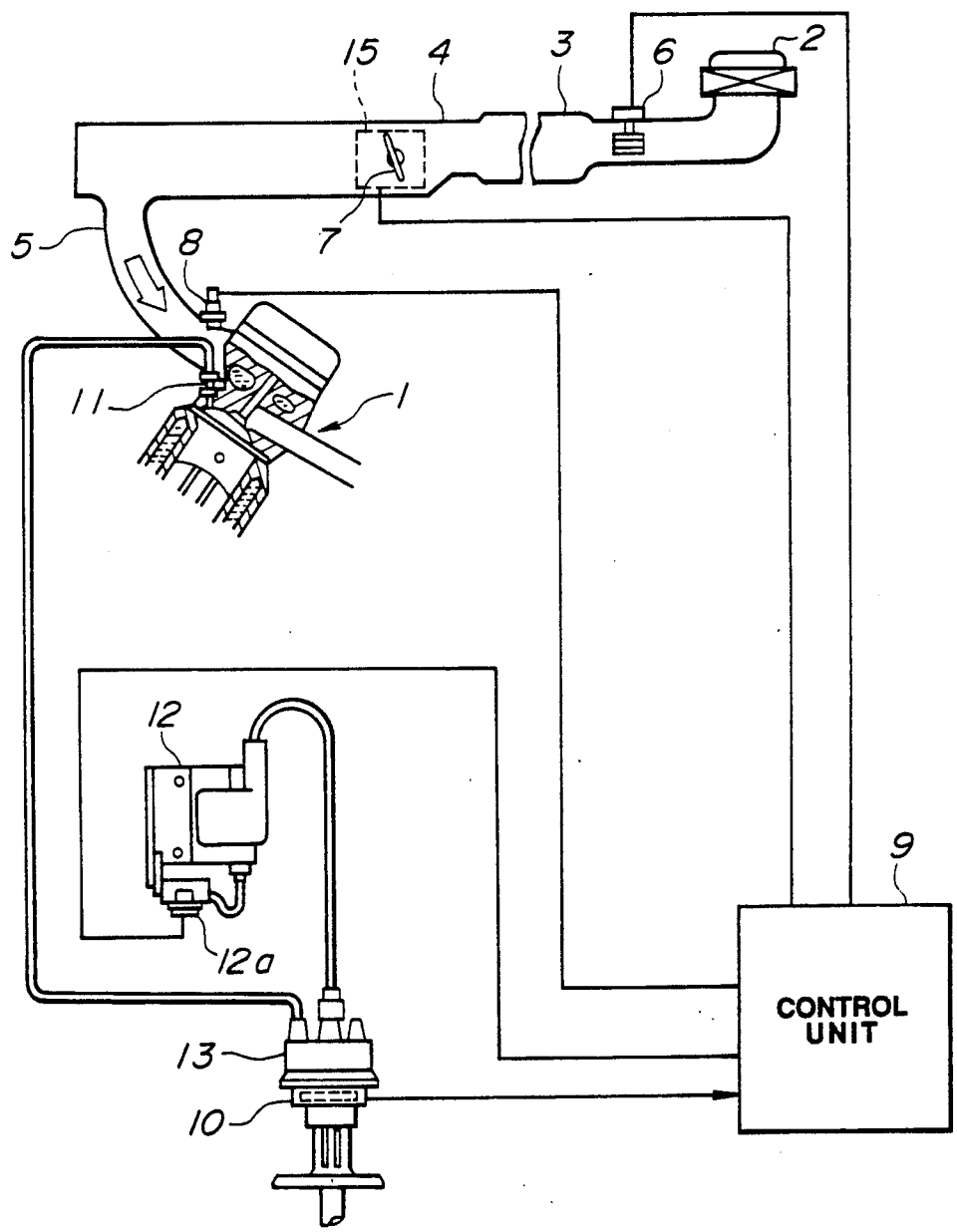
FIG. 2 is a schematic diagram showing engine engine system to which the present invention is applied.

FIG. 2 shows an engine system to which the present invention is applied. In the illustrated arrangement an internal combustion engine 1 is supplied with air induced via an air cleaner, and air induction duct 3 a throttle chamber 4 and an induction manifold 5. In this case an air-flow meter 6 is disposed in the air induction duct 3 and arranged to output a signal indicative of the amount of air Q being inducted. A throttle valve 7 is disposed in the throttle chamber 4 and operatively connected with a manually operated accelerator pedal. The throttle valve 7 is connected with a throttle position sensor 15. In this instance the sensor takes the form of a potentiometer which outputs a signal TVO indicative of the opening degree of the throttle valve 7.

Electromagnetically controlled type fuel injectors 8 (only one is shown) are arranged with the induction manifold 5 in manner to inject fuel thereinto at a location upstream of the combustion chambers of the engine. These injectors cooperate with a nonillustrated fuel supply system which includes a pressure regulator.

A control unit 9 includes a microprocessor and is operatively connected with the air flow meter 6 and the throttle valve position sensor 15 in a manner to receive data inputs indicative of Q and TVO therefrom. The control unit further receives a data input from the a crank angle sensor 10 which in this instance is included in the engine distributor 13. Using the above data the control unit 9 is arranged to derive the engine speed N and a basic fuel injection amount Tf. Based on this data and using additional data supplied by nonillustrated sensors such as engine coolant temperature sensors, exhaust gas air-fuel ration sensors and the like, the control unit derives an injection control pulse Ti which is used to control the operation of the fuel injectors 8.

The above mentioned engine speed is derived based on the inverse of the period between the generations of a REF pulse which is generated by the crank angle sensor 10.

Each of the cylinders of the engine is provided with a spark plug 11. These plugs are supplied with high voltage from a ignition coil 12 by way of the distributor 13. The ignition coil 12 includes a power transistor 12a by way of which the supply of high voltage is controlled. As shown, a power transistor 12a which controls the coil discharging, is arranged to be controlled by an output from the control unit 9.

In this embodiment the crank angle sensor 10 is arranged to produce a basic control pulse REF in a manner wherein the leading edge of each is produced at CRSET° BTDC of the compression phase of each cylinder and a width of 70°. The trailing edge therefore occurs at BTDC(CRSET−70)°. It will be noted that a pulse having a narrow pulse width (see FIG. 1) which is generated shortly after one of the basic control pulses in order to identify a predetermined cylinder is omitted from FIG. 3.

Figure 4:
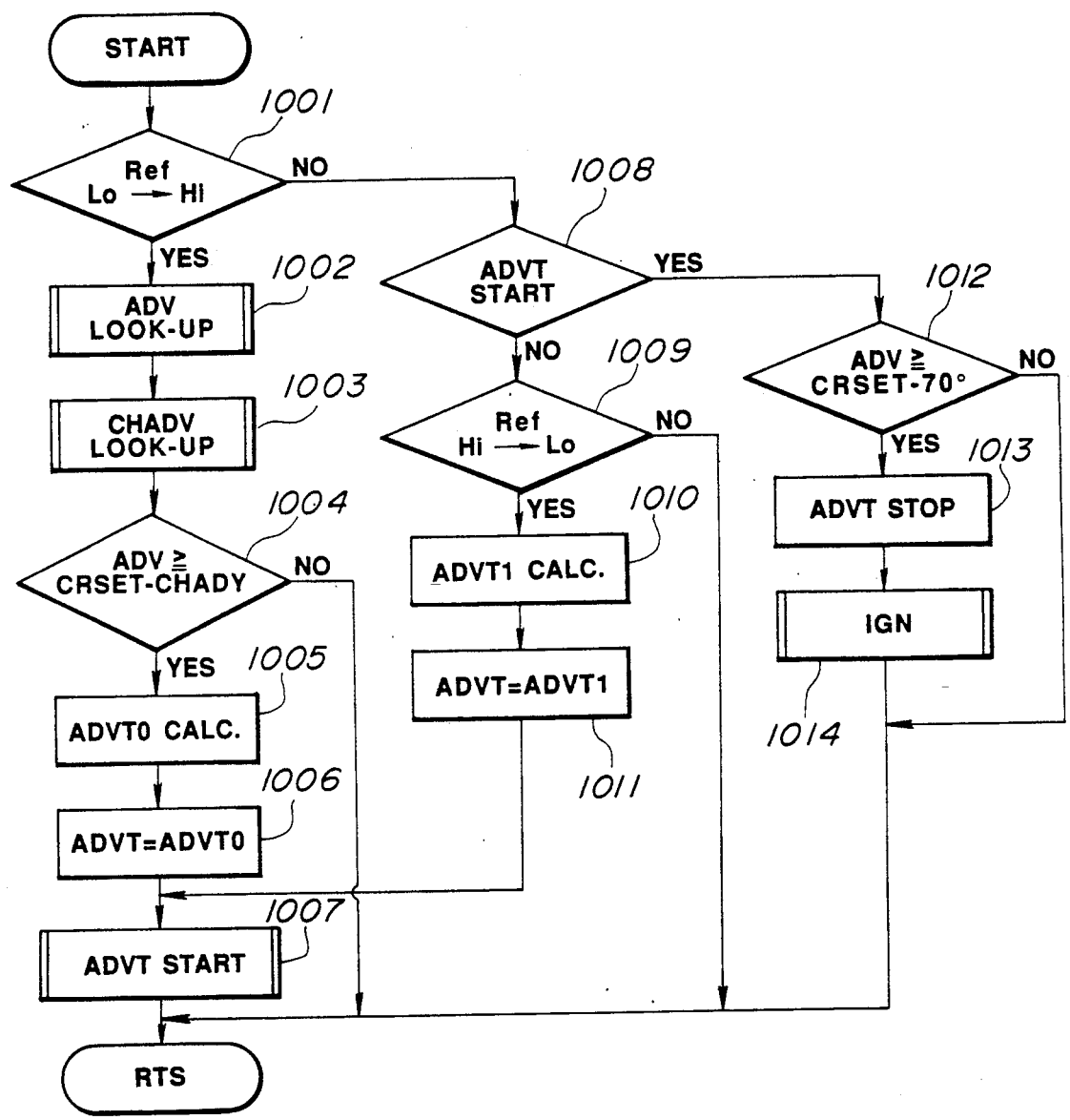
FIG. 4 is a flow chart which depicts the steps which are performed by a control program designed to implement the control of the present invention.

The microprocessor included in the control unit 9 is arranged to run a control program of the nature depicted in the flow chart of FIG. 4.

The first step of this routine is such as to determine if the level of the reference signal has changed from a low level to a high one or not. Viz., detects the occurrence of a REF pulse leading edge. Upon such a detection, the routine flows to step 1002 wherein the above described Tp and N values are read out of memory and used to perform an ADV (ignition timing advance angle) value look-up using mapped data which has simultaneously been fetched from ROM. Having determined the appropriate ADV value for the instant set of engine speed and load conditions, the routine goes to step 1003 wherein, in order to determine if is possible to derive a later mentioned ADVTI time period, the crank angle span CHADV required for a calculation which initiates with the leading edge of the basic control signal, is looked-up using the instant N value. As shown in FIG. 3 CHADV terminates at a point S which is used in the instant invention as a reference value with respect to which ignition advance and retard are determined.

At step 1004 the ADV value obtained in step 1002 is compared with the difference between a value CRSET (crank angle defined between the leading edge of the REF pulse and TDC) and the instant CHADV value. Viz., in this step it is determined if ADV ≥ CHSET−CHADV. If the outcome of this comparison is affirmative indicating that the ignition timing is advanced by more than the just mentioned difference, then even if the time from trailing edge ADV is calculated, there is insufficient time for the above mentioned calculation to actually be completed before the appropriate ignition timing is reached. Thus, in order to avoid the problems encountered with the prior art, the routine goes to step 1005 wherein the time ADVTO from the occurrence of the REF pulse leading edge to the ignition timing, is derived, viz.,:

$$ADVTO = TREFL \frac{(CRSET - ADV)}{110} - \qquad (2)$$
$$KAVAC1(TREFO - TREF) \frac{(CRSET - ADV)}{180}$$

wherein:
TREFL: is the time from the trailing edge of the previous REF pulse to the leading edge of the instant REF pulse.
TREFO: is the period for the previous REF pulse.
TREF: is the period for the instant REF pulse.
KAVACI: is the ADV anticipation gain.

At step 1006 the value of ADVTO which is obtained in step 1005 is set as the period ADVT from the point in time at which the REF pulse occurs to the time in time at which the ignition timing ADV should occur. In step 1007 a counter is set counting the ADVT time period.

On the other hand, if the outcome of step 1001 is negative and such as to indicate that the generation of the REF pulse leading edge has not just taken place, the routine goes to step 1008 wherein it is determined if the ADVT counter is running or not. In the case that the counter is not running then it is deemed that it has not been necessary to calculate the time from the leading edge of the REF pulse to the point in time where ignition should take place and the routine goes on to step 1009. In step 1009 it is determined if the trailing edge of the REF pulse has occurred or not. If the outcome is NO then the routine returns. On the other hand, if the trailing edge is detected then the routine goes to step 1010 wherein the following equation is used to determine a value ADVTI which is indicative of the time from the trailing edge to the ADV timing.

$$ADVTI = TREFH \frac{(CRSET - 70 - ADV)}{70} - \qquad (3)$$
$$KAVAC2(TREF - TREF1) \frac{(CRSET - 70 - ADV)}{180}$$

wherein:
TREFH: is the time from the leading edge of the instant REF pulse to the trailing edge thereof.
TREF: is the instant REF leading edge period.
TREF1: is the instant REF trailing edge period.
KAVAC2: is the ADV anticipation gain.

In this instance, the first part of equation 3 provides a value indicative of the REF pulse period related proportional value. That is to say, given the engine rotational speed is constant, this part of the equation provides a proportional control value which is used for time estimation and which is based on the time period TREFH defined between leading edge of the instant REF pulse and the trailing edge of the instant REF pulse. On the other hand, the second part of the equation relates to the rate of change of the REF generation period. That is to say, a value which is based on the difference between the instant TREF and TREF1 periods and which is modified by a proportional constant KAVAC2.

In the case wherein the engine speed increases, the ignition timing is advanced in accordance with the magnitude of the rate of increase. On the other hand, if the engine speed reduces, the magnitude of the rate of reduction is used to retard the ignition timing.

It should be noted that it is possible to alternatively use the following equation to derive the ADVTI time period.

$$ADVTI = TREFH \frac{(CRSET - 70 - ADV)}{70} - \quad (4)$$

$$KAVAC2 \left( \frac{TREFL}{110} - \frac{TREFH}{70} \right)(CRSET - 70 - ADV)$$

wherein:
TREFH: is the time from the leading edge of the instant REF pulse to the trailing edge thereof.
TREFL: is the time period between the trailing edge of the previous REF pulse and the leading edge of the instant REF pulse.

At step 1011 the ADVTI value which was obtained in step 1010 is used to set the final calculation time ADVT from the trailing edge of the REF pulse to the ignition timing ADV.

Further, at step 1008 in the event that it is found that the ADVT timer is in fact running, then the routine goes to step 1012 wherein the ADV value which is obtained by look-up in step 1002 is compared with a value of CREST−70°. In the event that ADV<−CREST−70° then the routine returns. On the other hand, if it is found that ADV≧CREST−70° then it is indicated that the ADV value obtained in step 1002 is advanced to a level which is earlier than the trailing edge of the REF pulse and therefore has already been exceeded. Accordingly, the routine goes to step 1013 wherein the ADVT count is stopped and at step 1014 a command to output the ignition control signal is issued.

With this type of control, even though the crank angle speed increases and decreases with the increase and decrease of the engine speed, in connection with the time ADVT defined between the leading edge of the REF pulse and the ignition timing ADV, as the setting of the CHADV crank angle establishes a reference point S with respect to which advance and retard can be determined, in the event that ADV is delayed with respect to S, then ADV can be determined using the REF period and the period rate of change of the instant REF pulse in manner which limits the effect of the engine speed variation on the deviation of the ignition timing control to the greatest possible limit, and thus improves the accuracy of the ignition timing control provided by the estimation which makes use of the period between generations of the REF pulse.

What is claimed is:

1. In an engine ignition system
means for generating a basic control pulse in a manner wherein the leading edge of the pulse is generated at a first predetermined crank angle and the trailing edge is generated at a second predetermined crank angle;
first means for estimating the time period from the point in time at which the level of the basic control pulse changes to the point in time at which an ignition control signal should be generated, based on at least the period at which the basic control pulse is generated;
second means for determining if the time required for the time period estimation which is initiated at the same time the leading edge is generated, will finish before a predetermined crank angle which occurs at a location retarded by a predetermined amount with respect to the time point at which trailing edge of basic control pulse occurs, or not; and
third means for, in the event that said second means indicates that the time required for the time period estimation will finish before a predetermined crank angle which occurs at a location retarded by a predetermined amount with respect to the time point at which trailing edge of basic control pulse occurs, recalculating at or before the time point at which the trailing edge occurs, the time from the point in time at which the trailing edge occurs to the point in time at which the ignition control signal should be generated, using at least the period defined between the leading and trailing edges.

2. An ignition system as claimed in claim 1 wherein the first means utilizes:
a proportional factor which is based on the period defined between the point in time the leading edge of the instant basic control pulse occurs and the point in time the leading edge of the previous basic control pulse occurred; and
an anticipation factor which is based on the rate at which periods defined between one of the leading and trailing edges of the instant and last two consecutive basic control pulses.

3. In a method of controlling the ignition of an internal combustion engine, the steps of:
generating a basic control pulse in a manner wherein the leading edge of the pulse occurs at a first predetermined crank angle and the trailing edge occurs at a second predetermined crank angle;
estimating the time period from the point in time at which the level of the basic control pulse changes to the point in time at which an ignition control signal should be generated, based on at least the period at which the basic control pulse is generated;
determining if the time required for the time period estimation which is initiated at the same time the leading edge is generated, will finish before a predetermined crank angle which occurs at a location retarded by a predetermined amount with respect to the time point at which trailing edge of basic control pulse occurs, or not; and
in the event that the time required for the time period estimation will finish before a predetermined crank angle which occurs at a location retarded by a predetermined amount with respect to the time point at which trailing edge of basic control pulse occurs, recalculating at or before the time point at which the trailing edge occurs, the time from the point in time at which the trailing edge occurs to the point in time at which the ignition control signal should be generated, using at least the period defined between the leading and trailing edges.

4. A method as claimed in claim 1 wherein the step of estimating the time period from the point in time at which the level of the basic control pulse changes to the point in time at which an ignition control signal should be generated, comprises:
using a proportional factor which is based on the period defined between the point in time the leading edge of the instant basic control pulse occurs and the point in time the leading edge of the previous basic control pulse occurred; and
using an anticipation factor which is based on the rate at which periods defined between one of the leading and trailing edges of the instant and last two consecutive basic control pulses.

* * * * *